United States Patent [19]

Mack

[11] Patent Number: 4,493,903

[45] Date of Patent: Jan. 15, 1985

[54] POLYMERIZATION PROCESS FOR DRAG REDUCING SUBSTANCES

[75] Inventor: Mark P. Mack, Ponca City, Okla.

[73] Assignee: Conoco Inc., Ponca City, Okla.

[21] Appl. No.: 549,359

[22] Filed: Nov. 7, 1983

Related U.S. Application Data

[60] Division of Ser. No. 262,870, May 12, 1981, Pat. No. 4,433,123, which is a continuation-in-part of Ser. No. 7,088, Jan. 29, 1979, abandoned, which is a continuation-in-part of Ser. No. 953,144, Oct. 20, 1978, abandoned.

[51] Int. Cl.$^3$ ............................................. C08F 4/64
[52] U.S. Cl. ............................ 502/121; 526/125; 526/139
[58] Field of Search ............................ 502/119, 121

[56] References Cited

U.S. PATENT DOCUMENTS

| | | | |
|---|---|---|---|
| 2,832,759 | 4/1958 | Nowlin et al. | 502/121 X |
| 3,736,307 | 5/1973 | Perry | 502/121 X |
| 4,124,530 | 11/1978 | Arzoumanidis | 502/119 |
| 4,142,991 | 3/1979 | Arzoumanidis et al. | 502/112 |

*Primary Examiner*—Patrick Garvin
*Attorney, Agent, or Firm*—Cortlan R. Schupbach

[57] ABSTRACT

A method is provided for the production of ultrahigh molecular weight drag reducing substances and the like comprising:
(a) preparing under an inert atmosphere a catalyst comprising:
  (1) titanium halide of the general formula $TiX_m$ wherein m=2.5 to 4.0;
  (2) a co-catalyst such as an organo-aluminum halide of the formula $AlR_nX_{3-n}$ where r is a hydrocarbon radical, X is a halogen and n is 2 or 3;
  (3) a phosphorous compound of the formula $PR_1R_2R_3$ or $P(OR_1)(OR_2)(OR_3)$ where $R_1$, $R_2$, and $R_3$ are, independently, aryl, alkyl, aralkyl, or alkaryl, containing from 1 to 12 carbon atoms and placing the catalyst in contact with;
(b) alpha-monoolefinic hydrocarbons from $C_2$–$C_{30}$ under suitable temperature conditions to provide a hydrocarbon soluble ultrahigh molecular weight polymer, then ceasing polymerization at a polymer content level of 20% by weight or less, based on the total reaction mixture.

3 Claims, No Drawings

POLYMERIZATION PROCESS FOR DRAG REDUCING SUBSTANCES

This is a division, of application Ser. No. 262,870, filed May 12, 1981 and now U.S. Pat. No. 4,433,123, which is a continuation-in-part of U.S. Ser. No. 7,088, filed Jan. 29, 1979 and now abandoned, which is a continuation-in-part of U.S. Ser. No. 953,144, filed Oct. 20, 1978 and now abandoned.

This invention relates to a method for the production of ultrahigh molecular weight polymers suitable for use as drag reducing agents. More particular, this invention provides a method for the production of ultrahigh molecular weight polymers using a modified Ziegler-Natta system while ceasing polymerization at low levels of polymer content based on the total reaction mixture.

It is well known that alpha-olefins may be polymerized in the presence of a catalyst generally referred to as a Ziegler-Natta catalyst. These catalysts generally consist of materials such as a titanium trihalide and organometallic cocatalysts such as aluminum alkyls or alkyl halides.

This basic catalyst system has been modified in many ways including a three component olefin polymerization catalyst containing alkyl aluminum sesquihalide and transition metal compounds such as disclosed in U.S. Pat. No. 2,951,066. The catalyst comprises a mixture of an alkyl aluminum sesquihalide, a transition metal halide, and a phosphine compound. The invention was designed to provide a method for the polymerization of alpha-monoolefins to yield high molecular weight crystalline polymers such as high-density polyethylene. These polymers are taught to be insoluble in solvents at ordinary temperatures, be highly crystalline and be suitable for molded objects exhibiting a high degree of stiffness. The process provides for a temperature range of from 0° C. to 250° C. and reaction pressures from atmospheric to about 20,000 pounds per square inch (psig).

U.S. Pat. No. 3,004,015 relates to an improved polymerization method using a stibine compound of the formula $SbR_3$ used as a modifier in the polymerization of alpha-olefins; stibine replaces phosphorous in the process. Both these materials contain Group VA elements.

U.S. Pat. No. 3,081,287 utilizes a mono-substituted aluminum dihalide of the formula $RAlX_2$ together with a transition metal and triphenylphosphine. The catalyst system is similar to that described in U.S. Pat. No. 2,951,066 which uses a mono-substituted aluminum dihalide instead of alkyl aluminum sesquihalide. The substitution, however, was not predictable since it is known that the activity of certain catalyst combinations are highly unpredictable and relatively minor changes in catalyst combinations can lead to liquid polymers rather than solid polymers.

U.S. Pat. No. 3,284,427 teaches a polymerization of alpha-olefins using a mixture of aluminum dihalides, transition metals such as titanium trichloride and a material from Group VA having the formula $R_3Z$ represented by triphenylphosphine or triphenyl stibine.

British Pat. No. 1,000,348 uses as third component in a Ziegler/Natta system an organic compound containing hydrogen and one atom from the group consisting of phosphorus, arsenic, and antimony directly bonded to one atom of the group consisting of phosphorus, arsenic, antimony, oxygen, sulfur, nitrogen and halogens. Provided that when the atom from the first group is phosphorus, the atom from the second group is not oxygen.

U.S. Pat. No. 3,977,997 provides a process for the manufacture of a modified titanium-containing catalyst for the polymerization of alpha-olefins of 3–6 carbon atoms. This patent teaches the use of a phosphorus-containing compound and teaches that propylene and butylene can be polymerized in the presence of a mixture of titanium trichloride and aluminum trichloride, triphenylphosphine, or tributylphosphine to yield an alpha-olefin polymer.

German Offenlegungsschrift No. 2,441,541 teaches ball milling titanium trichloride and a minor amount of aluminum trichloride with phosphine oxide or phosphite or phosphate ester or amide. U.S. Pat. No. 3,092,320 teaches the use of a catalyst for the manufacture of polypropylene by pulverizing titanium trichloride in ⅓ mole aluminum trichloride with tributylphosphine in the presence of a finely divided polymer.

However, none of these references, whether taken alone or in combination, teach or suggest a method for obtaining an ultrahigh molecular weight polymer with properties suitable for use as a drag reducing agent. These references are representative but not exhaustive of the art.

It would therefore be of great benefit to provide a method and a catalyst for an improved polymerization catalyst system for $C_2$–$C_{30}$ olefinic hydrocarbons which will provide ultrahigh molecular weight, non-crystalline polymers that are relatively hydrocarbon soluble having a high polymerization efficiency and suitable for use as a drag reducing agent. While it is recognized ethylene is not per se an alpha-olefin, ethylene will be classified as such for comment throughout this specification since ethylene can be present in amounts generally below about 10% by weight.

It is therefore an object of the present invention to provide an improved polymerization catalyst for alphaolefinic hydrocarbons which will produce ultrahigh molecular weight, non-crystalline hydrocarbon soluble polymers by utilizing a catalyst having a high activity or efficiency.

It has now been found in accordance with the instant invention that ultrahigh molecular weight, non-crystalline polymers having good hydrocarbon solubility can be obtained from a process comprising:

(a) preparing under an inert atmosphere a catalyst comprising:
  (1) titanium trichloride of the general formula $TiX_m$ wherein is from 2.5 to 4.0;
  (2) a cocatalyst such as an organo-aluminum halide of the formula $AlR_nX_{3-n}$ where R is a hydrocarbon radical, X is a halogen and n is 2 or 3 and a
  (3) phosphorus compound of the formula $PR_1R_2R_3$ or $P(OR_1)(OR_2)(OR_3)$ where $R_1$, $R_2$, and $R_3$ are, independently, aryl, alkyl, aralkyl, or alkaryl, containing from 1 to 12 carbon/atoms and placing the catalyst in contact with;

(b) $C_2$–$C_{30}$ α-monoolefinic hydrocarbons under temperature conditions suitable to form high molecular weight polymers, then (c) ceasing polymerization at a polymer content level of 20% by weight or less, based on the total reaction mixture.

Reaction conditions of (a) and (b) are generally inert, anhydrous, and temperatures of from about −25° C. to about 80° C. Pressures can be either higher or lower than atmospheric, depending on the olefins used. High pressures may be necessary to contain the more volatile ethylene or alpha-olefin compounds. Preferred temperatures are from about 10° C. to about 30° C.

Thus, according to the instant invention, an aluminum alkyl or aluminum alkyl halide is preferred as a cocatalyst for the titanium trichloride, triphenylphosphine polymerization of an alpha-olefin. The resulting polymer mixture prepared in accordance with the instant invention can be used as a drag reducing substance or an anti-mist agent. The resulting polymers produced are of ultrahigh molecular weight, yet are not suitable to form molded objects, cannot be suitably extruded and cannot suitably be injected or molded into solid articles.

The instant invention provides for the manufacture of a mixture containing an ultrahigh molecular weight noncrystalline polymer in a hydrocarbon solvent. However, the polymer can be manufactured in an olefin with no additional solvent. The entire mixture can then be used as a drag reducing substance for pumpable liquids or an anti-mist agent for volatile liquids. Catalyst residues and solvents can be removed from the polymer by means of precipitation or washing from the polymer. This is well-known in the art. The solid non-crystalline polymer can be added to pipelines or hydrocarbons. However, for use as a drag reducing agent or anti-mist agent, such steps would not normally be carried out since the recovery of raw materials is difficult and additional processing steps are required with resulting economic loss.

The instant invention provides the most favorable method for preparing a drag reducing polymer or anti-mist agent since the polyolefin is produced in a hydrocarbon solvent and the entire mixture containing polyolefin, solvent, and catalyst particles can be used, thus allowing great economic efficiency. No separation is required.

Several types of titanium trichloride are available commercially, most sold by Stauffer Chemical Company, USA. Most are preferred by the reduction of titanium tetrachloride. with aluminum. The well-known type 1.1 (or AA) catalyst is titanium trichloride containing approximately ⅓ mole of aluminum trichloride per mole of titanium chloride. Type 1.13 catalyst includes further additives and produces a higher active catalyst for propylene polymerization as well as a polymer of higher tacticity. Belgium Pat. No. 851,154 teaches a method for preparing a titanium catalyst by freshly reducing titanium tetrachloride with aluminum and adding a small amount of monocyclic terpenic ketones or bicyclic terpenic ketones. An inorganic compound can be added to further activate the catalyst to improve catalyst performance.

When a titanium trichloride catalyst containing monocyclic terpenic ketones and bicyclic terpenic ketones was used in place of a catalyst not containing these additives under the same conditions, the rate of polymerization increased but the average molecular weight of the product severely decreased. It is known in the art that low molecular weight alpha-olefin polymers are not effective drag reducing substances when added to crude oil being transported in pipelines as taught in U.S. Pat. No. 3,692,676. Drag reduction increases with a polyolefin having increased average molecular weight. Alpha-olefinic polymers prepared from $C_8$ to $C_{10}$ alpha-olefins gave best results. The addition of a small amount of ultrahigh molecular weight poly(octene-1) to hydrocarbons being pumped showed a drag reduction ranging from 30 to 50%. I have found that olefinic polymers containing $C_2$ to $C_{30}$ α-olefins may produce effective drag reducers and anti-mist agents.

While α-olefins having from 2 to 30 carbon atoms can be used in the present invention, the amount of $C_2$ to $C_7$ olefins used must be adjusted to permit dissolution of the non-crystalline polymer in the hydrocarbon system in which drag is to be reduced. Normally, 10 weight percent total of these materials is the maximum useable amount, with lesser amounts normally used. For each hydrocarbon system, amounts of these lower olefins are adjusted such that solubility is not adversely affected.

Preferably, the present invention will utilize olefins having from 8 to 30 carbon atoms, while olefins of 8 to 12 carbon atoms and most preferably 8 to 10 carbon atoms are used. Mixtures of the olefins can be used, too.

The phosphorus containing component of the catalyst mixture is a compound having the general formula $PR_1R_2R_3$ or $P(OR_1)(OR_2)(OR_3)$ wherein each R is independently selected from the group consisting of aryl, alkyl, aralkyl, cycloalkyl, cycloalkylaryl, or alkaryl containing from 1 to 12 carbon atoms. Representative but non-exhaustive examples of such compounds are tri-n-butylphosphine, triethylphosphine, triphenylphosphine, tribenzylphosphine, triethylbutylphosphine, diphenylethylphosphine, tricyclohexylphosphine, dibutylethylphosphine, dioctylphenylphosphine, tributylphosphite, triethylphosphite, triisopropylphosphite, trimethylphosphite, and triphenylphosphite.

The mole ratio of the three components of the catalyst system of the instant invention will depend upon the specific end result desired. However, generally a ratio of aluminum to phosphorous will range from about 0.01 to 0.99, respectively. A mole ratio of Al/phosphorous/Ti of 3/0.25–0.50/1.0 is preferred. The catalyst mixture can be simply prepared by mixing the three components. No extensive milling or complicated combination is necessary.

A preferred method for preparing drag reducing substances comprises contacting α-olefins containing from 2 to 30 carbon atoms with (a) titanium trichloride of the general formula $TiCl_3.mAlCl_3$ wherein m is from 0.00 to 1.00, prepared by a method selected from the group consisting of:
  (1) reducing titanium tetrachloride with aluminum,
  (2) reducing titanium tetrachloride with hydrogen,
  (3) reducing titanium tetrachloride with an organometallic compound, or
  (4) milling titanium trichloride with $AlCl_3$ in conjunction with (b) a cocatalyst such as an organo-aluminum halide of the formula $AlR_nX_{3-n}$ where R is a hydrocarbon radical, X is halogen and n is 2 or 3, and a (c) catalyst modifier of the formula $PR_1R_2R_3$ or $P(OR_1)(OR_2)(OR_3)$ wherein $R_1$, $R_2$, and $R_3$ are, independently aryl, alkyl, aralkyl, or alkaryl containing from 1 to 12 carbon atoms.

The preferred catalyst is crystalline titanium trichloride, prepared by reducing titanium tetrachloride with aluminum of the general $TiCl_3.\frac{1}{3}AlCl_3$. This catalyst is sold by the Stauffer Chemical Company as Type 1.1. Other catalysts can be used, for example, Stauffer's Type 1.13 materials. This is also a $TiCl_3.\frac{1}{3}AlCl_3$ catalyst which has been activated chemically and/or physically in its preparation.

The transition metal portion of the catalyst of the instant invention is preferably comprised of (a) a crystalline titanium trichloride prepared by a method selected from the group consisting of
  (1) reducing titanium tetrachloride with a metal such as aluminum;
  (2) reducing titanium tetrachloride with hydrogen,
  (3) reducing titanium tetrachloride with an organometallic compound such as an aluminum alkyl, or
  (4) by milling titanium trichloride with aluminum trichloride together with
(b) 2.5 to 10 weight percent based on the weight of the titanium trichloride portion of the catalyst of an effective ketone; and
(c) 0 to 1.0 weight percent based on the total weight of the titanium trichloride component of an ionic or polar compound.

Representative but non-exhaustive examples of ionic or polar compounds are Group IA or IIA metal halides such as sodium bromide, potassium bromide, sodium chloride, sodium iodide, transition metals, aliphatic triacid salts, alkaline earth metal phosphates and alkyl alkali metal sulfates.

Effective ketones are alkyl ketones having a carbonyl group attached directly to two aliphatic groups, aryl ketones having a carbonyl group attached directly to two aromatic groups, aralkyl ketones having a carbonyl group attached directly to one aliphatic group and to one aromatic group, cyclic ketones having a carbonyl group attached directly to a carbocyclic structure. These groups attached directly to the carbonyl group can have aromatic substituents in the case of alkyl groups, and both aromatic and alkyl substituents in the case of alkyl groups, and both aromatic and alkyl substituents in the case of aryl and cyclic groups.

Representative but non-exhaustive examples of ketones useful in the practice of the present invention are alkyl ketones such as methyl ethyl ketone, methyl-n-propyl ketone, benzylacetone, 2-butanone, di-n-hexyl ketone, 1,1-diphenylacetone, 3-pentanone, 3-methyl-2-butanone, 2-heptanone, 3-heptanone, 4-heptanone, 2-hexanone, 3-hexanone, 2-nonanone, 5-nonanone, 2-octanone, 4-octanone, 2-pentanone, 3-pentanone, phenylacetone; aryl ketones such as benzophenone, 2-methylbenzophenone, 4-methylbenzophenone; aralkyl ketones such as acetophenone, 4-acetylbiphenyl, 2-acetylfluorene, 2-acetylphenanthrene, 3-acetylphenanthrene, 9-acetylphenanthrene; and carbocyclic ketones such as bicylo[3.3.1]-nonan-9-one, bicylo[3.2.1]octan-2-one, (+)-camphor, dl-camphor, d-carvone, l-carvone, cyclobutanone, cyclodecanone, cyclododecanone, 1-decalone, 1-decalone, 2-decalone, 1-indanone, 2-indanone, menthone, 1-methyl-2-decalone, norcamphor, (+)-pulegone. Preferred ketones useful in the present invention are saturated monocyclic and bicyclic ketones such as camphor, carbomenthone, fenchone, menthone, thujone, verbanone, and verbenone.

The preferred cocatalyst of the instant invention is an alkyl aluminum halide having the general formula $AlR_nX_{3-n}$ where R is a hydrocarbon radical containing 1-20 carbon atoms such as aryl, alkyl, aralkyl, or alkaryl, X is a hydrogen atom and/or halogen atom, and n varies from 2 to 3. Representative examples of such organoaluminum compounds which can be used alone or in combination are trimethylaluminum, triethylaluminum, tri-n-propylaluminum, tri-n-butylaluminum, triisobutylaluminum, tri-n-hexylaluminum, tri(2-methylpentyl)aluminum, tri-n-octylaluminum, diethylaluminum hydride, diisobutylaluminum hydrides, diisopropylaluminum chloride, dimethylaluminum chloride, diethylaluminum chloride, diethylaluminum bromide, diethylaluminum iodide, di-n-propylaluminum chloride, di-n-butylaluminum chloride, diisobutylaluminum chloride, or mixtures of these. Mixtures of these organoaluminum compounds can, of course, be used as the co-catalyst.

The polymerization of the α-olefins can be carried out in a non-solvent system; that is, the liquid monomers themselves can be utilized as a solvent. However, the polymerization can also be carried out in an inactive hydrocarbon solvent such as branched or straight chain aliphatic compounds. Representative examples of such compounds are pentane, hexane, heptane or octane. Alicyclic hydrocarbon substances can also be used. Representative examples of such substances are benzene, toluene, and xylene. Analogues of the above hydrocarbons or their mixtures can be used; for example, LPA solvent (low polynuclear aromatic solvent, a very high purity aliphatic hydrocarbon having a molecular weight very similar to kerosene and a low aromatic and olefin content, sold by Conoco Inc.).

The catalyst should be handled under an inert atomsphere during preparation and polymerization in order to minimize deterioration. Representative examples of suitable inert atmospheres are nitrogen and argon.

A wide range of polymerization conditions can be utilized in the process of the instant invention. Generally the polymerization will be carried out at pressures from atmospheric to about 1,000 atmospheres, but atmospheres from 1 to 25 atmospheres are preferred. The polymerization temperatures generally will range from about −40° C. to about 100° C., but preferred temperatures are from about 0° to about 50° C. Increasing the temperature will result in an increase in catalytic rate, but will decrease the average molecular weight of the polymer which is not desired when drag reducing agents are being prepared. The polymerization can be carried out either by batch or continuous methods. The polymerization reaction can be conducted either adiabatically or isothermal. The polymerization may be terminated by conventional methods used for the deactivation of Ziegler-Natta catalysts. For example, the polymerization can be halted by the addition of a small amount of alcohol while the polymerization mixture is under an inert atmosphere.

It is essential that the polymerization mixture contains 20 weight percent or less polymer content based on total reaction mixture. The resulting drag reducing mixture will then contain less than 20 weight percent of the ultrahigh molecular weight, non-crystalline hydrocarbon soluble polyolefin, a hydrocarbon solvent (or unreacted olefins), deactivated catalysts, and a small amount of alcohols (if desired). The entire mixture can be used as a drag reducing substance. The polymer may be precipitated by a variety of techniques if desired. These techniques are well-known to those skilled in this art. In addition, materials can be added to prevent deterioration of the mixture or corrosion of its environment. For example, materials such as epoxides (propylene oxide) or compounds containing at least one oxirane unit; primary, secondary and tertiary amines (such as triethylamine, tributylamine, trioctylamine); polyamines; natural amino compounds (such as coco-propylene diamine) and Group IA and IIA metal hydroxide bases. In addition, corrosion inhibitors such as propargyl alcohol or commercial film forming materials (such as INHIBITOR 98, trademark of and sold by Sherwin-Williams Company) can be used.

It is essential that the polymerization contain 20% by weight or less of polymer content based on the total reaction mixture in order to obtain a suitable drag reducing agent. As the polymerization continues to higher levels, the average molecular weight will rapidly decrease, with increasing bulk viscosity, making the materials unsuitable for use as drag reducing agents. It is preferred in the practice of the instant invention to cease polymerization at polymer content levels ranging from about 5 to about 20 weight percent. However, polymer content levels from 5 to 15 weight percent are preferred and polymer content levels of from 10 to 12% are most preferred, all based on the total reaction mixture.

The invention is more concretely described with reference to the examples below wherein all parts and percentages are by weight based on the total reaction mixture, unless otherwise specified. The examples are provided to illustrate the instant invention and not to limit it.

EXAMPLES 1 THROUGH 6

Polymerizations of octene-1 were conducted at 20°±1° C. bath temperature using an olefin charge of 40.0% by weight. Both conventional and phosphine modified systems were compared. The unmodified system was terminated below 10% by weight and above 30% by weight, while the phosphine modified systems were terminated at levels of about 5, about 8, about 15, and about 25% by weight. Drag reduction measurements were obtained at 10 parts per million and 10 feet per second in a ⅜-inch pipe viscometer.

In carrying out the polymerizations, dried degassed LPA (low polynuclear aromatic solvent) was placed into a clean, dry one quart pressure vessel. Diethylaluminum chloride in heptane was added followed by the addition of the catalyst modifier tri-n-butyl phosphine. Transition metal catalyst, titanium trichloride of Stauffer Type 1.1, was then added. The mixture was placed into a constant temperature bath and stirred at 290 revolutions per minute for about 30 minutes. A stream of octene-1 was added under an inert atmosphere to initiate polymerization. Polymerizations were halted by using isopropanol to deactivate the catalyst. The ratio of polymerization components was 375/3.0/0.25/1.0 (millimoles of octene-1/diethylaluminum chloride/phosphine modifier/TiCl₃).

The inherent viscosity $\eta_{inh}$, was determined for each polymer using a Canon-Ubbelohde four bulb shear dilution viscometer (0.1 g polymer/100 ml LPA solvent at 25° C.) Inherent viscosities were calculated for each of the four bulbs. The viscosities were plotted as a function of shear rate. The plot was then used to obtain an inherent viscosity at a shear rate of 300 sec$^{-1}$.

Drag reduction measurements were made in a ⅜ inch ID pipe viscometer at a flow rate of 10 feet-per-second and diesel oil was the test fluid. In this test, diesel oil was continuously circulated and flowed from a 5-gallon storage tank through a Moyno progressive cavity pump into a 5-foot test section of ⅜-inch stainless precision tubing and returned to the 5-gallon tank. The storage tank was temperature controlled by a Kryomat constant temperature controller. The temperature of the test sample was maintained at 74° F. and was continuously stirred at low speed in the tank.

The pressure drop differences were measured in percent drag reduction as calculated using the formula $$\% \; DR = \frac{\Delta P_{base} - \Delta P_{additive}}{\Delta P_{base}} \times 100$$

where $\Delta P_{base}$ is the initial base line pressure of diesel oil without the additive and $\Delta P_{additive}$ is the pressure drop with the polymer solution. The results of these tests are presented in Table 1.

TABLE 1

| | Phosphine Modified Catalyst vs Conventional Ziegler Catalyst | | | | | |
|---|---|---|---|---|---|---|
| | | | | | % Drag Reduction at 10 ppm polymer content and 10fps pumping velocity | |
| Example | Electron Donor Modifier | Final Wt % Polymer | Catalytic Activity (gm/gmTi.Hr) | Inherent viscosity (dl/gm, = 300 sec sec⁻¹) | Initial | 1.0 min |
| 1 | None | 6.75% | 222 | 10.28 | 44.55 | 37.88 |
| 2 | None | 32.77 | 330 | 6.65 | 29.79 | 23.71 |
| 3 | n-Bu₃P | 4.39 | 175 | 11.12 | 47.77 | 40.68 |
| 4 | n-Bu₃P | 8.27 | 248 | 10.52 | 45.19 | 38.93 |
| 5 | n-Bu₃P | 15.34 | 413 | 9.37 | 43.18 | 37.73 |
| 6 | n-Bu₃P | 25.14 | 248 | 9.24 | 42.11 | 35.83 |

EXAMPLES 7 THOUGH 16

Dried degassed solvent was placed into a clean and dry 1 quart pressure vessel. Diethylaluminum chloride (DEAC) was added followed by triphenylphosphine. Titanium catalysts (Stauffer type 1.1 or 1.13) were added under an inert atmosphere of dry argon. The type 1.13 catalyst contained camphor, a saturated bicyclic monoterpenic ketone. The resulting mixture was placed into an agitated water bath and the catalyst components were allowed to interact for 30 minutes at 290 revolutions per minute (rpm). Octene-1 monomer was charged into the reaction vessel. Polymerizations were terminated using 1.7 milliliters isopropyl alcohol to deactivate the catalyst. The polymeric mixture was stabilized using butyl hydroxytoluene as an antioxidant and propylene oxide was added to scavenge HCl formed.

For purposes of comparison a catalyst system was prepared under identical conditions except triphenylphosphine was not used. Comparative data and results are shown in Table 2. In the table, diethylaluminum chloride is abbreviated DEAC; triphenylphosphine is abbreviated TPP; TiCl₃ (AA) is equaled to TiCl₃·⅓AlCl₃. The catalyst type refers to titanium trichloride classification of the Stauffer Chemical Company. Catalyst activity is expressed as grams of poly(octene-1)

produced per gram of titanium used per hour in LPA as a solvent at 30±1° C., the polymerizations were initially charged with a 7.5% monomer by weight based on the total reaction charge, having a catalyst millimole ratio of 255/3/1 (octene-1/DEAC/TiCl$_3$(AA)) and inh is inherent viscosity in a Canon-Fenske single bulb viscometer (0.1 g polymer/100 ml LPA solvent at 25° C.).

In Table 3, LPA was the solvent at a polymerization temperature of 25±1° C. using a 14.8% monomer charge and having a polymerization charge ratio of 375/3/1 (millimoles octene-1/DEAC/TiCl$_3$ obtained from Stauffer Chemical Co.).

TABLE 2
EFFECT OF TRIPHENYLPHOSPHINE
ON THE ACTIVITY AND
INHERENT VISCOSITY FOR THE
POLYMERIZATION OF OCTENE-1

| Example | mmol DEAC | mmol TPP | mmol TiCl$_3$(AA) | Catalyst Type | Catalyst Activity | $\eta$inh dl/g, (single bulb) |
|---|---|---|---|---|---|---|
| 7 | 2.9 | .00 | .98 | 1.1 | 45.8 | 6.83 |
| 8 | 2.9 | .00 | .96 | 1.13 | 121.0 | 4.86 |
| 9 | 3.0 | .36 | .99 | 1.1 | 65.6 | 8.05 |
| 10 | 3.2 | .39 | 1.1 | 1.13 | 138.0 | 6.92 |

TABLE 3
EFFECT OF TRIPHENYLPHOSPHINE
ON THE
POLYMERIZATION OF OCTENE-1

| Example | mmol DEAC | mmol TPP | mmol Type 1.13 TiCl$_3$(AA) | Catalyst Activity | $\eta$inh (single bulb) | Wt. % Polymer | Reaction Time (Hours) |
|---|---|---|---|---|---|---|---|
| 11 | 3.4 | .00 | 1.14 | 167 | 6.61 | 8.52 | 3.02 |
| 12 | 3.6 | .15 | 1.20 | 150 | 7.64 | 7.38 | 2.92 |
| 13 | 3.7 | .00 | 1.22 | 145 | 6.27 | 9.55 | 3.93 |
| 14 | 3.5 | .17 | 1.17 | 134 | 7.56 | 8.68 | 3.82 |
| 15 | 3.5 | .00 | 1.16 | 125 | 6.16 | 10.52 | 4.98 |
| 16 | 3.4 | .15 | 1.12 | 122 | 7.54 | 10.11 | 4.95 |

A catalyst mixture containing EASC, ethylaluminum sesquichloride, TiCl$_3$/TPP was investigated for the polymerization of octene-1 in Example 17. The product produced was inferior with respect to drag reducing ability. The catalyst activity was very low and not acceptable for commercial purposes, although some reaction did occur.

A catalyst mixture consisting of DEAC, TiCl$_3$ and TPP produced an ultrahigh molecular weight product which was acceptable for drag reducing purposes as shown in Example 18. The catalyst system was about 25 times more active at the conditions studied than the EASC/TiCl$_3$/TPP catalyst (Example 19).

Level of drag reduction depends on many variables. For example, changes in drag reduction takes place with each change in pipe size, pumping pressure, type of pumps, temperature, and composition of material (where even small variations in hydrocarbon content cause changes).

A polyolefin content greater than about 20 percent by weight is not desirable because of its high bulk viscosity. At high percent polymer content the mixture produces low molecular weight polymers. The viscous polymer mass has poor mass transfer and heat transfer properties, which further lowers the molecular weight of the polymer. Thus the conditions described are necessary to obtain an ultrahigh molecular weight polymer suitable for drag reduction uses.

The following examples show a comparison of catalyst systems and demonstrates a catalyst comprising of DEAC/TPP/TiCl$_3$ produces an effective drag reducing substance at high rates. The system of the instant invention outperforms catalyst mixtures consisting of EASC/TiCl$_3$ or EASC/TPP/TiCl$_3$ or systems such as DEAC/TiCl$_3$ for the polymerization of octene-1 to poly(octene-1) in a hydrocarbon solvent of 25±1° C. Example 17 shows the instant invention while Examples 18, 19 and 20 show the other systems described. The abbreviations used are identical to those described for Table 2.

EXAMPLE 17

Distilled, deoxgenated and dry LPA (275 milliliters) was placed into a clean dry 1 quart pressure vessel under dry argon gas. A 10 weight percent solution of diethylaluminum chloride (2.77 mmols) in heptane was added followed by triphenylphosphine (0.23 mmols) and titanium trichloride produced by the Stauffer Chemical Company, trademark Grade AA type 1.1, (0.92 mmols TiCl$_3$ were added under an atmosphere of dry argon with stirring). The resulting mixture was placed in a shaker bath and the catalyst components were allowed to react for 30 minutes at 290 rpm at a temperature of 25±1° C. The monomer, octene-1(38.8 grams) was introduced to the reaction vessel to initiate polymerization at atmospheric pressure. Polymerization was continued with stirring for 1.37 hours then terminated with isopropyl alcohol (1.7 ml) to deactivate the catalyst. The polymeric mixture was stabilized using butylated hydroxy toluene as an antioxidant (1.7 ml) and propylene oxide was added to scavenge any hydrochloride present. At the termination of the polymerization, 77.38 grams of the mixture was poured into 400 ml of isopropanol with sufficient mixing to precipitate a viscous material. The substance was washed with 400 ml of isopropanol, filtered and washed with 400 ml of methanol to remove catalyst residue. The poly(octene-1) was collected by filtration and dried in a vacuum oven. The inherent viscosity of the polymer was determined to be 9.38 dl/gm in a single bulb Canon-Fenske viscometer in the usual manner.

EXAMPLE 18

A comparative example was carried out using diethylaluminum chloride and TiCl$_3$ (type 1.1) in the absence of triphenylphosphine as a catalyst modifier. The polymerization method used in Example 17 was followed for this polymerization of octene-1. The inherent viscosity of the polymer obtained was 7.90 dl/gm. The comparison clearly demonstrates that the addition of a phosphine compound to the DEAC/TiCl$_3$ catalyst system enhances average molecular weight of the polymer as measured by inherent viscosity. It is also demonstrated that the addition of the modifier increased the activity of the catalyst as determined by grams of poly-(octene-1) produced per gram of titanium used per hour in LPA as the solvent at 25±1° C. using a 14.8 weight percent monomer charge.

EXAMPLE 19

A comparative example is carried out using a catalyst system employing ethylaluminum sesquichloride (EASC), triphenylphosphine, titanium trichloride for the polymerization of octene-1. The polymerization method was identical to Example 17 except that EASC was used as a cocatalyst. The inherent viscosity of the poly(octene-1) produced was 3.77 dl/gm. The catalyst activity was 7.53 grams of polymer per gram of titanium per hour. The polymer obtained was unacceptable as a drag reducing substance. In addition, the catalyst activity was low and not acceptable for most commercial applications.

EXAMPLE 20

A third comparative example was carried out using a 2-component catalyst system comprising ethylaluminum sesquichloride and titanium trichloride for the polymerization of octene-1 at 25°±1° C. Triphenylphosphine was not added to the catalyst mixture. In other respects the polymerization was carried out identically to that described in Example 17. The inherent viscosity of the poly(octene-1) produced was 4.3 dl/gm and the catalyst had an activity of 8.75 grams of polymer per gram of titanium per hour.

All pertinent results and comparative data for examples 17 through 20 are shown in tabular form in Table 4.

TABLE 4
EFFECT OF VARIOUS CATALYSTS ON THE ACTIVITY AND INHERENT VISCOSITY FOR THE POLYMERIZATION OF OCTENE-1

| Example | Catalyst Ratio | Mole Ratio | Catalyst Activity | Wt. % Polymer | $\eta_{inh}$ (dl/gm, single bulb) |
|---|---|---|---|---|---|
| 17 | DEAC-TPP-TiCl$_3$(1.1) | 3:0.25:1 | 181 | 4.18 | 9.38 |
| 18 | DEAC-TiCl$_3$(1.1) | 3:1 | 142 | 5.22 | 7.90 |
| 19 | EASC-TPP-TiCl$_3$(1.1) | 3:0.25:1 | 7.53 | 2.37 | 3.77 |
| 20 | EASC-TiCl$_3$(1.1) | 3:1 | 8.75 | 2.85 | 4.30 |

Examples 21 and 22 were carried out to determine relative crystallinity of the solid-drag reducing component.

Samples of poly(octene-1) using a tri-n-butyl phosphine modified system were compared with samples of a poly(octene-1) using a conventional catalyst system. After obtaining polymers, two samples were placed on indented glass slides, pressed flat with a microscope slide and held flat in a vise for 72 hours. The flattened samples were scanned with Cu K $\alpha$ radiation and the diffraction patterns recorded. Both samples yield a characteristic non-crystalline diffraction pattern similar to those obtained from liquids, and is described in "X-Ray Diffraction Patterns of Polymers" by J. W. Turley, Dow Chemical Company, Midland, Mich. 1964. The pattern showed two broad maxima at approximately 14 and 4.6 angstroms which indicated that the certain spacings within the polymers occur with a particular high frequency.

EXAMPLE 21

Dried, degassed low polynuclear aromatic (LPA) solvent was placed into a clean dry 1 quart pressure vessel. Diethylaluminum chloride was added followed by the addition of titanium trichloride catalyst obtained from Stauffer Chemical Company (Type 1.1, TiCl$_3$.$\frac{1}{3}$AlCl$_3$). The materials were added under inert atmosphere of dry argon. The resulting mixture was placed into an agitated water bath and the catalyst components were allowed to interact for 30 minutes while stirring at 290 rpm. The polymerization was initiated by the addition of octene-1 (obtained from Ethyl Corporation). The polymerization was terminated 40 minutes later by the addition of 1.7 ml of isopropyl alcohol with mixing in order to deactivate the catalyst. The polymer mixture was stabilized using butylated hydroxy toluene (BHT) as an antioxidant. The polymerization was initially charged with 40% weight octene-1 and LPA as a polymerization diluent. The starting temperature was 20°±1° C. The ratio of polymerization compounds was 357/3/1 (millimoles of octene-1/diethylaluminum chloride/TiCl$_3$.AA).

In determining weight of polymer produced, 46 grams of deactivated polymer mixture was placed into a 400 ml of isopropanol with sufficient mixing to precipitate a viscous material containing poly(octene-1). The substance was washed with an additional 400 ml of isopropanol filtered and washed with 400 ml of methanol to remove catalyst residues. Poly (octene-1) was collected by vacuum filtration and dried in a vacuum oven overnight to obtain a control polymer.

Example 22 shows the polymerization method of the instant invention.

EXAMPLE 22

Dried, degassed LPA as a solvent (78 ml) was placed in a clean dry 1 quart pressure vessel. Diethylaluminum chloride (3.15 millimoles) was added followed by the addition of tri-n-butyl phosphine 0.26 millimoles). A titanium trichloride catalyst (1.05 millimoles) was added having the formula TiCl$_3$.$\frac{1}{3}$AlCl$_3$ (type 1.1 from Stauffer Chemical Company).

Polymerization materials were combined under an inert atmosphere of dry argon. The resulting mixture was placed into a shaker bath and agitated at 290 revolutions per minute at 20±1° C. for 30 minutes.

Polymerization was initiated using 62.4 ml of octene-1 from Ethyl Corporation. The olefin was dried with molecular sieves and degassed with argon. Initially the polymerization contained about 40% monomer by weight.

The polymerization reaction was terminated 33 minutes later by adding 1.7 ml of isopropyl alcohol to deactivate the catalyst. The polymer was stabilized using butylated hydroxy toluene as an antioxidant.

In determining the weight percent of polymer produced, 42 grams of the deactivated mixture was placed into 400 ml of isopropanol with sufficient mixing to precipitate a viscous material containing poly(octene-1). The material was washed with an additional 400 ml of isopropanol filtered and washed with 400 ml of methanol to remove catalyst residues. The poly(octene-1) was collected by vacuum filtration and dried in a vacuum oven overnight to obtain a polymer from the phosphine modified catalyst system. The polymerization produced 4.39% polymer by weight with an inherent viscosity of 11.12 deciliters per gram at a shear rate of 300 sec$^{-1}$ (0.1 grams of polymer/100 ml of LPA at 25° C.) in a four-bulb Canon-Ubbelohde viscometer.

Thus, according to the instant invention, a catalyst comprising a titanium halide and an organoaluminum halide with a phosphine compound is shown to produce polymer mixtures useful as drag reducing substances or antimist agents under the specific conditions outlined in this application. The resulting polymers are non-crystalline and of ultrahigh molecular weight, but are not suitable to form molded objects. The products of the instant invention cannot be easily extruded to form pipe or tubing having rigid properties and cannot be easily injection molded. The use of a ketone in conjunction with a phosphorous-modified $TiCl_3.mAlCl_3$ polymerization catalyst provides an improved reaction, wherein catalyst activity is greatly enhanced while maintaining product polymer inherent viscosity; in contrast to high activity, low inherent viscosity found when using ketones only, and low activity, high inherent viscosity found when using phosphorus compounds only.

While certain embodiments and details have been shown for the purpose of illustrating this invention, it will be apparent to those skilled in this art that various changes and modifications may be made herein without departing from the spirit or scope of the invention.

I claim:

1. A catalyst for the polymerization of γ-olefins containing from 2 to 30 carbon atoms, to form non-crystalline, hydrocarbon-soluble polymers; comprising,
    (a) titanium trichloride of the general formula $TiCl_3.mAlCl_3$ wherein m is from 0.00 to 1.00, which is selected from the group consisting of products produced by;
        (1) reducing titanium tetrachloride with aluminum,
        (2) reducing titanium tetrachloride with hydrogen,
        (3) reducing titanium tetrachloride with an organometallic compound, or
        (4) milling titanium tetrachloride with a Group II metal, in conjunction with
    (b) a ketone,
    (c) a compound selected from the group consisting of Group IA or IIA metal halides, transition metals, quaternary ammonium halide or sulfate salts, alkaline earth phosphates and alkyl alkali metal sulfates,
    (d) an organo-aluminum halide of the formula $AlR_nX_{3-n}$ where R is a hydrocarbon radical, X is halogen and n is 2 or 3, and
    (e) a catalyst modifier of the formula $PR_1R_2R_3$ or $P(OR_1)(OR_2)(OR_3)$ wherein $R_1$, $R_2$, and $R_3$ are, independently, aryl, alkyl, aralkyl, or alkaryl.

2. A catalyst as described in claim 1 wherein the ketone is saturated monocyclic monoterpenic ketone or a bicyclic monoterpenic.

3. A catalyst as described in claim 2 wherein the $TiCl_3$ contains $0.33AlCl_3$, the bicyclic monoterpenic ketone is camphor, the ionic compound is sodium bromide, the organo aluminum halide is diethyl aluminum chloride and the catalyst modifier is triphenylphosphine.

* * * * *

UNITED STATES PATENT AND TRADEMARK OFFICE
CERTIFICATE OF CORRECTION

PATENT NO. : 4,493,903
DATED : January 15, 1985
INVENTOR(S) : Mark P. Mack

It is certified that error appears in the above-identified patent and that said Letters Patent are hereby corrected as shown below:

Claim 1 first line, "$\gamma$-olefins" should be --$\alpha$-olefins--.

Signed and Sealed this

Sixteenth Day of July 1985

[SEAL]

Attest:

DONALD J. QUIGG

*Attesting Officer*     *Acting Commissioner of Patents and Trademarks*